United States Patent [19]

Günther

[11] Patent Number: 4,857,236

[45] Date of Patent: Aug. 15, 1989

[54] PROCESS FOR ISOLATING PHOSPHATIDYLCHOLINE FREE OF LYSOPHOSPHATIDYLCHOLINE FROM EGG POWDER

[75] Inventor: Bernd-Rainer Günther, Bergheim, Fed. Rep. of Germany

[73] Assignee: A. Nattermann & Cie GmbH, Fed. Rep. of Germany

[21] Appl. No.: 57,695

[22] Filed: May 26, 1987

Related U.S. Application Data

[63] Continuation of Ser. No. 806,769, Dec. 9, 1985.

[30] Foreign Application Priority Data

Dec. 17, 1984 [DE] Fed. Rep. of Germany ....... 3445950

[51] Int. Cl.$^4$ ................................................. C07F 9/10
[52] U.S. Cl. ..................................... 260/403; 558/146
[58] Field of Search .......................... 260/403; 558/146

[56] References Cited

U.S. PATENT DOCUMENTS

| | | | |
|---|---|---|---|
| 4,425,276 | 1/1984 | Günther | 260/403 |
| 4,443,378 | 4/1984 | Günther | 260/403 |
| 4,452,743 | 6/1984 | Günther | 260/403 |

FOREIGN PATENT DOCUMENTS 2915614 10/1980 Fed. Rep. of Germany ...... 260/403

OTHER PUBLICATIONS

*The Merck Index*, Tenth Edition, (1983), pp. 779-780 (#5271).

*Primary Examiner*—Charles F. Warren
*Attorney, Agent, or Firm*—Pearne, Gordon, McCoy & Granger

[57] ABSTRACT

A process for isolating phosphatidylcholine free of lysophospholipid from egg powder wherein the egg powder is treated with a solvent mixture of a low boiling petroleum ether fraction (40° to 80° C.), a lower $C_1$-$C_4$-alkanol and water, the undissolved material is separated from the solution phase, the solution phase is given onto a column filled with silica gel at a temperature in the range from 20° to 50° C., the elution is carried out at that temperature with the same solvent mixture, the main run is collected and the dissolved phosphatidylcholine is isolated therefrom as usual.

11 Claims, No Drawings

PROCESS FOR ISOLATING PHOSPHATIDYLCHOLINE FREE OF LYSOPHOSPHATIDYLCHOLINE FROM EGG POWDER

This is a continuation of application Ser. No. 806,769, filed 12/9/85, now abandoned.

The invention relates to a new process for isolating pure 1,2-diacyl-glycero-3-phosphocholine (phosphatidylcholine) which is free of lysophospholipids by chromatography of an egg powder-extract solution on silica gel.

Phospholipids are used inter alia in food industry, animal nutrition, cosmetics, and pharmacy. In pharmacy, pure phosphatidylcholine is used as active agent and as excipient, f.e. as emulsifying agent for the preparation of fat emulsions to be administered partenterally and for forming liposomes. In particular, for the parenteral use predominantly egg-phosphatidylcholine which should be free of heamolytically acting lysophospholipids, is used.

As starting material for the preparation and recovery, respectively, of egg-phospholipids raw yolk is used having about the following composition:
- 50% water
- 31% egg-lipids
- 16% proteins
- 3% ash portions The egg-lipid portion consists of neutral lipids (triglycerides, cholesterine etc.) and the phospholipids. The isolation of the egg-lipid portion is carried out by direct extraction of the egg yolk, f.e. with dimethyl ether (DE-PS 2, 833, 371) or by extraction of the dried egg yolk (powder of the yellow of an egg).

The dried yellow of an egg is preferably used for the recovery of the phospholipids; it has about the following composition:
- 32% proteins
- 50% triglycerides/cholesterine
- 18% phospholipids The phospholipids are preferably recovered by the extraction with petroleum ether, ether, chloroform, methanol or ethanol and by the precipitation with acetone: US-PS 2, 013, 804, DE-PS 260 886, DE-PS 261, 212, DE-PS 272, 057, DE-PS 487, 335, Jap koka 79 61 200. The phospholipid portion according to K. Orsinger, Seifen-Öle-Fette-Wachse 109, 495–499 (1983) consists of:
- 73% phosphatidylcholine (PC)
- 5–6% lysophosphatidycholine (LPC)
- 15% phosphatidylethanolamine (PE)
- 2–3% lysophosphatidylethanolamine (LPE)
- 1% phosphatidylinositol (PI)
- 2–3% sphingomyelin (SHA)
- 1% plasmalogen (PLA)

This phospholipid mixture is also called pure egg-lecithin, P. H. List et al., Pharmazeutische Verfahrenstechnik heute 1 (7) 1–8 (1980). This egg-lecithin is used in the food industry and pharmacy.

The separation of this phospholipid mixture into the single phospholipids is very complicated and therefore is not carried out on a large scale, although in particular pure phosphatidylcholine free of lyso-phospholipid is desired in particular for the use in pharmacy. A number of complicated laboratory methods is known for the recovery of pure phosphatidylcholine. For example, according to M. Marsh et al., Clinica Chimica Acta 43, 87–90 (1973), phosphatidylcholine free of lysophosphatidylcholine is obtained by a complicated double column chromatography, wherein i.a. a gradient elution is carried out wherein solvent mixtures like chloroform/methanol toxicologically objectable for the pharmacy are used. The recovery of the solvents (azeotropic mixtures) is impossible.

N. S. Radin, J. Lipid Res. 13, 922–924, starts from egg-lecithin. The egg-lecithin is dissolved in ethanol and introduced into an aluminum chromatographic column and eluted with ethanol, phosphatidylethanolamine being separated. The evaporated eluate containing phosphatidylcholine, lysophosphatidylcholine, sphingomyline and neutral lipids is dissolved in a solvent mixture of hexane, isopropanol and water and introduced into a $SiO_2$-column and eluted with the same solvent mixture, wherein a yield of 40 to 43% is obtained. Although a phosphatidylcholine containing low amounts of contaminants of lysophosphatidylcholine and sphingomyline is obtained, however this is only possible by using a complicated four-step process and by using four different solvents and solvent mixtures, respectively. Moreover, in this procedure the phosphatidylcholine efficiency is only 44%, based on the used egg-powder.

The object of the present invention is to provide a simple process for isolating directly from egg powder highly pure phosphatidylcholine free of lysophosphatidylcholine.

Surprisingly, it has been found that highly pure phosphatidylcholine free of lysophosphatidylcholine can be obtained by extracting egg powder with a solvent mixture of petroleum ether, propanol-2 and water, followed by a silica gel column chromatography of the extract using the same solvent mixture.

The process of the invention is characterized in that egg powder is extracted with a solvent mixture of a low boiling petroleum ether fraction (40°–80° C.), a lower $C_1$–$C_4$-alkanol and water, preferably with a mixture of 1 part by volume of light petrol (65°–73° C.), 1 part by volume of 2-propanol and 0.175 part by volume of water, i.e. the egg powder is treated (f.i. stirred) with said solvent mixture and the undissolved material is separated from the solution phase, the solution phase is given onto a column filled with silica gel at a temperature in the range from 20° to 50° C., an elution is carried out at this temperature with the same solvent mixture, the main run of the eluate is collected and the phosphatidylcholine, which is free of lysophosphatidylcholine, is isolated therefrom as usual. In the pre-run i.e. triglycerides, cholesterine and phosphatidylethanolamine, in the main-run phosphatidylcholine and in the post-run lysophosphatidylcholine and sphingomyeline are collected. The phosphatidylethanolamine can be isolated in a pure form from the pre-run according to known processes.

As starting materials also prepurified egg-phospholipids, f.e. deoiled ones, can be used.

Known silica gel products for the chromatography of various grain size or compressed silica gel which is activated or deactivated, may be used. Preferably, neutral silica gel products are used.

The process of the invention is carried out at normal pressure or at superatmospheric pressure at temperatures as allowable for the pressures, preferably at 20°–25° C.

A specific advantage of the process of the invention is that the silica gel after the chromatography can always be re-used. All contaminants are contained in the pre-run and the post-run, respectively. The post-run can be omitted, since if the column is refilled, the contaminants contained therein are eluted with the next-following pre-run.

An additional advantage is the use of only one, easily redistillable solvent mixture for the extraction and separation by column chromatography.

In comparison with known processes the new process is characterized by a substantially simpler procedure. The phosphatidylcholine is recovered with an efficiency of 92% based on the egg-powder. In a column chromatographic separation 90 g of egg-lipids are separated on 200 g of silica gel, only 4.2 l of total eluate being necessary. The process has the character of a filtration rather than that of a purification by column chromatography in the common sense.

The invention is illustrated by the following example without being limited thereto.

ANALYSIS

The phosphatides were analyzed by means of thin layer chromatography. The oil content was considered equal to the dialysable material.

Column Chromatography, Solvent Mixture

A chromatography column having a inner diameter of 4.5 cm and a height of 37 cm was used. A heat exchanger was provided before the column. The column was filled with a slurry of 200 g of silica gel (Merck) in a solvent mixture of light petrol (65°–73° C.)/2-propanol/water in a ratio of 1/1/0.175 (v/v/v). The same solvent mixture was used for the extraction of egg-powder and for elution. After the completed chromatography, the silica gel can be re-used.

Starting material

An egg-powder having the following composition was used:
11% phosphatidylcholine
4% sphingomyeline
3% phosphatidylethanolamine
1.5% lysophosphatidylcholine
0.5% other phospholipids
48% neutral/lipids/cholesterine
32% proteins

EXAMPLE 1

First step 150 g of egg-powder are stirred with 300 ml solvent mixture for 10 minutes at 40° C. the proteins are sucked off and washed with little solvent mixture. One obtains 300 ml of a filtrate containing 90 g of egg-lipids.

Second step

The filtrate is introduced into a chromatographic column filled with a silica gel (200 g) and eluted with the same solvent mixture at room temperature.

The total eluate (5 l) is divided into three fractions. The fractions are evaporated and the residues are analyzed.
1. Fraction 0–1.6 l residue: 69 g, containing neutral lipids (including cholesterine), PE, LPE, PI, traces of PC and traces of SPH.
2. Fraction 1.6–4.2 l residue: 16.1 g.
  PC content: 94%
  SPH content: <2%
  LPC content: ≦0.3%
  oil content: ≦0.5%
  rest: lipids, water etc.
  PC efficiency 92% of the theory, based on egg-powder
3. Fraction 4.2–5.0 l residue: 4 g, containing SPH, LPC and traces of PC.

After collecting the second fraction egg-lipids can again be refilled, whereby the products of the third fraction can be eluted together with those of the first fraction.

EXAMPLE 2

Comparative Example

First step

Process according to Japan kokai 79 61 200

155 g of egg-powder are stirred with 1350 ml of 95% ethanol at room temperature. After filtration of the insoluble components and washing with 95% ethanol the collected ethanol filtrates are evaporated.
  solid yield: 36 g egg lipids
  phosphatidylcholine content: 42%
  sphingomyeline content: 3%
  lysophosphatidylcholine content: 2%
  phosphatidylethanolamine content: 8%
  rest: triglycerides, cholesterine etc.

Second step

According to DE-OS 3, 047, 048

A column chromatography (100 g of silica gel) is carried out at 65° C. using ethanol as eluent.
  Column input: 36 g of egg-lipids in 500 ml of 95% ethanol
  Eluent
    (1) 95% ethanol for 1.7 l first-eluate
    (2) 80% ethanol for 1.2 l second-eluate
After the 1.7 l of the first-eluate 1.2 l of the second-eluate are collected. The second-eluate is evaporated and analyzed.
  solid yield: 10.4 g
  phosphatidylcholine content: 85%
  sphingomyeline content: 6%
  lysophosphatidylcholine content: 5%
  oil content: 0.5%
  rest: water, ethanol etc.
  phosphatidylcholine efficiency: 54% of the theory, based on egg-powder

Third step

The column has to be reequilibrated before the reuse with 95% ethanol.

EXAMPLE 3

Comparative Example

Process according to N. S. Radin, J. Lipid Res. 19, 922–924 (1978)

First step 150 g of egg powder are extracted with 1.35 l of 95% ethanol at room temperature, the extract is filtrated and evaporated, 36 g of raw egg-lecithin are obtained having the following composition.
  42% phosphatidylcholine
  8% phosphatidylethanolamine
  2% lysophosphatidylcholine
  3% sphingomyeline rest: triglycerides, cholesterine etc.

Second step 10 g of this egg-lecithin are dissolved in abs. ethanol and a column chromatography on 100 g $Al_2O_3$ is carried out. As eluent abs. ethanol is used.

The eluate is evaporated and a phospholipid mixture (5 g) having the following composition is obtained:
51% phosphatidylcholine
3% lysophosphatidylcholine
5% sphingomyeline
rest: neutral/lipids, cholesterine etc.

Third step 2.5 g of the phospholipid mixture obtained in the second step are dissolved in 2.5 ml of a mixture of hexane/isopropanol/water (1:1.3:02; v/v/v) and introduced into a column filled with 100 g silica gel. After the addition of further 100 ml of the same solvent mixture an elution is carried out with 1.4 l of a mixture of hexane/isopropanol/water (1:1.3:0.25; v/v/v). After the pre-run (triglycerides/cholesterine) the main-run is collected and evaporated.
residue: 1.1 g
composition:
91% phosphatidylcholine
2% sphingomyeline
1% lysophosphatidylcholine
6% water, residual solvent, triglycerides
PC-efficiency: 44%, based on egg-powder

Fourth step

The column has to be reequilibrated before the reuse with hexane/isopropanol/water (1:1.3:0.2; v/v/v).

Summary:

| | starting material: egg-powder | | |
|---|---|---|---|
| | Example 1 | Example 2 | Example 3 |
| Number of the necessary steps until to the reuse of the silica gel | 2 | 3 | 4 |
| PC-efficiency, based on egg-powder: | 92% | 54% | 44% |
| Number of the solvents and mixtures, respectively: | 1 | 2 | 4 |
| PC content | 94% | 85% | 91% |

As a comparison of the examples shows, according to the process of the invention in a simple procedure comprising two steps using only one solvent mixture phosphatidylcholine can be obtained in a high yield and having a high purity.

What I claim is:

1. A process for isolating phosphatidylcholine free of lysophospholipid from egg powder wherein the egg powder is extracted with a solvent mixture of a low boiling petroleum ether fraction (40° to 80° C.), a lower $C_1$-$C_4$-alkanol and water, the undissolved material is separated from the solution phase, the solution phase is introduced into a column filled with silica gel at a temperature in the range from 20° to 50° C., the elution is carried out at that temperature with the same solvent mixture, the main run is collected and the dissolved phosphatidylcholine is isolated therefrom.

2. The process according to claim 1 wherein a solvent mixture of light petrol (65°–73° C.)/propanol and water is used.

3. The process according to claim 2 wherein a solvent mixture of 1 part by volume of light petrol (65°–73° C.)/1 part by volume of propanol-2 and 0.175 part by volume of water is used.

4. The process according to claim 3 wherein the treatment of the starting egg powder is carried out for 10 to 20 minutes at 20° to 50° C.

5. The process according to claim 4 wherein the column chromatography is carried out at 20° to 25° C.

6. The process according to claim 1 wherein a solvent mixture of 1 part by volume of light petrol (65°–73° C.)/1 part by volume of propanol-2 and 0.175 part by volume of water is used.

7. The process according to claim 6 wherein the treatment of the starting egg powder is carried out for 10 to 20 minutes at 20° to 50° C.

8. The process according to claim 7 wherein the column chromatography is carried out at 20° to 25° C.

9. The process according to claim 1 wherein the treatment of the starting egg powder is carried out for 10 to 20 minutes at 20° to 50° C.

10. The process according to claim 9 wherein the column chromatography is carried out at 20° to 25° C.

11. The process according to claim 1 wherein the column chromatography is carried out at 20° to 25° C.

* * * * *